United States Patent
Suzuki et al.

(10) Patent No.: US 12,218,340 B2
(45) Date of Patent: Feb. 4, 2025

(54) ALKALINE BATTERY AND METHOD OF PRODUCING NEGATIVE ELECTRODE GEL FOR ALKALINE BATTERY

(71) Applicant: FDK CORPORATION, Tokyo (JP)

(72) Inventors: Yuya Suzuki, Tokyo (JP); Shigeyuki Kuniya, Tokyo (JP); Takeo Nogami, Tokyo (JP); Shingo Anzai, Tokyo (JP); Shunji Matsui, Tokyo (JP)

(73) Assignee: FDK CORPORATION, Tokyo (JP)

( * ) Notice: Subject to any disclaimer, the term of this patent is extended or adjusted under 35 U.S.C. 154(b) by 92 days.

(21) Appl. No.: 17/124,505

(22) Filed: Dec. 17, 2020

(65) Prior Publication Data

US 2021/0104734 A1    Apr. 8, 2021

Related U.S. Application Data

(63) Continuation of application No. PCT/JP2019/024276, filed on Jun. 19, 2019.

(30) Foreign Application Priority Data

Jun. 20, 2018    (JP) ................. 2018-116914

(51) Int. Cl.
*H01M 4/24* (2006.01)
*H01M 4/26* (2006.01)
*H01M 10/26* (2006.01)

(52) U.S. Cl.
CPC ............. *H01M 4/244* (2013.01); *H01M 4/26* (2013.01); *H01M 10/26* (2013.01)

(58) Field of Classification Search
CPC ........ H01M 4/244; H01M 10/26; H01M 4/04; H01M 4/12; H01M 4/26; H01M 4/42; H01M 4/622; H01M 6/06; H01M 6/22; Y02E 60/10
See application file for complete search history.

(56) References Cited

U.S. PATENT DOCUMENTS

| 5,348,816 A | * | 9/1994 | Shinoda | H01M 4/12 |
| | | | | 429/225 |
| 5,376,480 A | * | 12/1994 | Shinoda | H01M 4/62 |
| | | | | 429/185 |
| 2005/0236121 A1 | | 10/2005 | Kondo | |

(Continued)

FOREIGN PATENT DOCUMENTS

| CN | 101154730 A | * | 4/2008 |
| CN | 101533902 A | | 9/2009 |

(Continued)

OTHER PUBLICATIONS

Machine translation of JP 2019038923 A (Year: 2019).*

(Continued)

*Primary Examiner* — Matthew T Martin
*Assistant Examiner* — Jared Hansen
(74) *Attorney, Agent, or Firm* — Isshiki & Partners; Joseph P. Farrar, Esq.

(57) ABSTRACT

An alkaline battery and a method of producing an alkaline battery that includes a negative electrode gel in which a negative electrode active material made of a zinc alloy and a binder are dispersed in an alkaline aqueous solution. Ultrafine microfibrils form the binder.

2 Claims, 1 Drawing Sheet

(56) References Cited

U.S. PATENT DOCUMENTS

| | | | | |
|---|---|---|---|---|
| 2007/0231703 | A1* | 10/2007 | Ohtani | H01M 4/40 429/300 |
| 2009/0226815 | A1 | 9/2009 | Sumiyama | |
| 2011/0143210 | A1 | 6/2011 | Shimamura et al. | |
| 2011/0229760 | A1* | 9/2011 | Hidaka | H01M 4/1393 241/24.1 |
| 2012/0171565 | A1* | 7/2012 | Kato | H01M 4/42 429/206 |
| 2014/0199578 | A1* | 7/2014 | Mitra | H01M 4/625 429/127 |
| 2014/0248537 | A1 | 9/2014 | Hayashi et al. | |
| 2016/0115249 | A1 | 4/2016 | Noguchi et al. | |
| 2018/0108941 | A1 | 4/2018 | Lee et al. | |
| 2018/0114978 | A1* | 4/2018 | Armacanqui | H01M 4/62 |
| 2019/0312258 | A1* | 10/2019 | Nakamura | C08L 1/26 |
| 2020/0190266 | A1* | 6/2020 | Akuta | C08F 2/50 |

FOREIGN PATENT DOCUMENTS

| | | | | |
|---|---|---|---|---|
| CN | 102150309 | A | | 8/2011 |
| CN | 107369811 | A | | 11/2017 |
| EP | 2602844 | A1 | | 6/2013 |
| JP | S58-005965 | A | | 1/1983 |
| JP | S64-077872 | A | | 3/1989 |
| JP | H02-244556 | A | | 9/1990 |
| JP | H06-196159 | A | | 7/1994 |
| JP | H10-64505 | A | | 3/1998 |
| JP | 2005-270891 | A | | 10/2005 |
| JP | 2008-001728 | A | | 1/2008 |
| JP | 2010-118286 | A | | 5/2010 |
| JP | 2014-199742 | A | | 10/2014 |
| JP | 2017-025468 | A | | 2/2017 |
| JP | 2017228456 | A | | 12/2017 |
| JP | 2019038923 | A | * | 3/2019 ............ C08F 2/44 |
| KR | 20160083718 | A | * | 7/2016 |
| WO | 2013/042720 | A1 | | 3/2013 |
| WO | 2016/182100 | A1 | | 11/2016 |

OTHER PUBLICATIONS

Sigma-Aldrich SDS Methyl Cellulose, pp. 1-8 (2022) (Year: 2022).*

CN101154730A, Huanjun, "Lithium ion battery anode material and anode and lithium ion battery containing the said material", machine English translation retrieved from https://worldwide.espacenet.com/ Date: Mar. 6, 2024 (Year: 2008).*

Shi, Ye, et al. "Energy gels: A bio-inspired material platform for advanced energy applications." Nano Today 11.6 (2016): 738-762 (Year: 2016).*

Jarvis, Michael C. "Structure of native cellulose microfibrils, the starting point for nanocellulose manufacture." Philosophical Transactions of the Royal Society A: Mathematical, Physical and Engineering Sciences 376.2112 (2018): 20170045 (Year: 2017).*

Nippon Paper Group Sunraose® (CMC), retrieved from https://www.nipponpapergroup.com/ and https://web.archive.org/web/20171228185212/https://www.nipponpapergroup.com/english/products/chemical/sunrose/ Date: Mar. 6, 2024 (Year: 2017).*

KR20160083718A, Han, et al. "Composition for preparing negative electrode of lithium secondary battery, method for preparing the same . . . ", machine English translation retrieved from https://worldwide.espacenet.com/ Date: Nov. 1, 2024 (Year: 2016).*

International Search Report (ISR) for Application No. PCT/JP2019/024276 dated Aug. 14, 2019.

English Translation of the ISR for Application No. PCT/JP2019/024276 dated Aug. 14, 2019.

Written Opinion of the International Search Authority for Application No. PCT/JP2019/024276 dated Aug. 14, 2019.

Partial translation of Written Opinion of the International Search Authority for Application No. PCT/JP2019/024276 dated Aug. 14, 2019.

Extended European Search Report (EESR) for EP Application No. 19822088 (PCT/JP2019/024276) issued May 2, 2022.

Chinese Office Action for Application No. 201980031299.8 issued Feb. 3, 2024.

English translation of the Chinese Office Action for Application No. 201980031299.8 issued Feb. 3, 2024.

Chinese Office Action for Application No. 201980031299.8 issued Aug. 30, 2024.

English language translation of the Chinese Office Action for Application No. 201980031299.8 issued Aug. 30, 2024.

Chinese Office Action for Application No. 201980031299.8 issued May 30, 2024.

Machine-generated English translation of the Chinese Office Action for Application No. 201980031299.8 issued May 30, 2024.

* cited by examiner

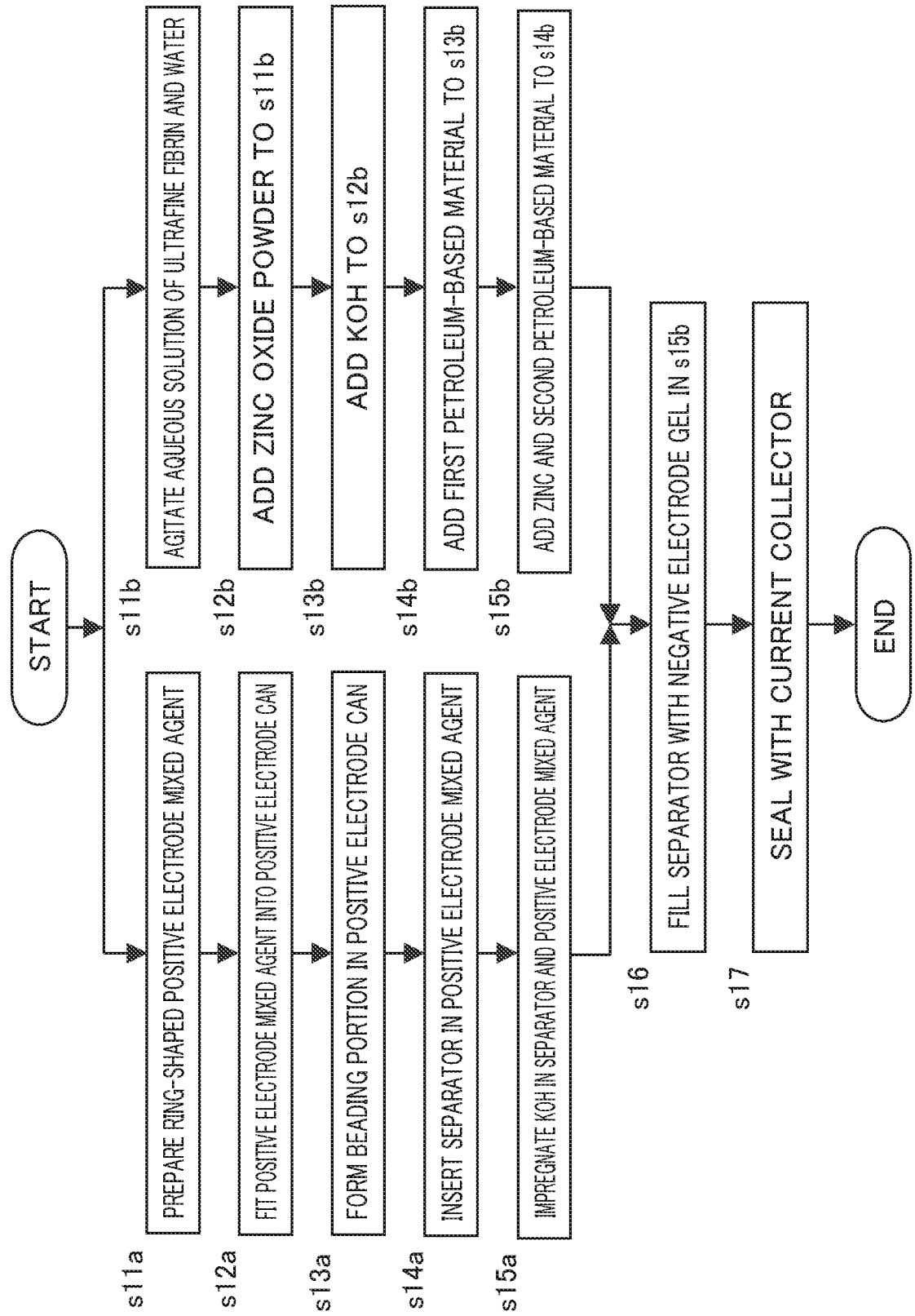

ALKALINE BATTERY AND METHOD OF PRODUCING NEGATIVE ELECTRODE GEL FOR ALKALINE BATTERY

CROSS-REFERENCE TO RELATED APPLICATIONS

This is a continuation application of International Patent Application No. PCT/JP2019/024276 filed Jun. 19, 2019, which claims the benefit of priority to Japanese Patent Application No. 2018-116914 filed Jun. 20, 2018, the entire contents of each of which are hereby incorporated herein by reference.

BACKGROUND

Technical Field

The present disclosure relates to an alkaline battery and a method of producing a negative electrode gel for an alkaline battery.

Description of the Related Art

Alkaline batteries using as active materials manganese dioxide for the positive electrode and zinc for the negative electrode are known.

More specifically, used in the positive electrode is a mixed agent electrode in which a conductive auxiliary agent such as graphite, a binder, an electrolytic solution, and the like are mixed in addition to manganese dioxide as an active material, and used in the negative electrode is a gel-like electrode in which a binder, an electrolyte solution, and the like are mixed in addition to zinc powder as an active material. In addition, as the electrolyte solution, an alkaline electrolyte solution is used in which potassium hydroxide, sodium hydroxide, or the like is dissolved in water. Alkaline batteries are usually obtained by sequentially performing the fitting of a positive electrode mixed agent, the insertion of a separator, the injection/impregnation of an electrolyte, the injection of a gel, and a sealing step.

As the binder for the negative electrode, a petroleum-based material is often used, such as polyacrylic acid, polyacrylate, polyvinyl alcohol, styrene butadiene rubber, alginic acid, polyethylene, polypropylene, or polytetrafluoroethylene.

However, to lessen the environmental impact, there is a need for non-petroleum-based materials derived from plants and the like for the binder.

Moreover, these materials are also required to improve the discharge performance of the battery by allowing efficient use of the water content in the negative electrode.

To this end, cellulose fibers and the like are known as non-petroleum-based materials.

In view of such circumstances, it is an objective to provide an alkaline battery capable of reducing the environmental impact and a method of producing a negative electrode gel used in the alkaline battery.

SUMMARY

An aspect of the disclosure to achieve the above objective is an alkaline battery including a negative electrode gel in which a negative electrode active material made of a zinc alloy and a binder are dispersed in an alkaline aqueous solution, wherein ultrafine microfibrils form the binder. Note that the zinc alloy also includes an alloy with trace amounts of metals other than zinc.

The alkaline battery preferably contains 0.2 wt % or more and 0.7 wt % or less of the ultrafine microfibrils in an aqueous solution content of the negative electrode gel.

Another aspect of the disclosure is a method of producing a negative electrode gel for an alkaline battery in which a negative electrode active material made of a zinc alloy is dispersed together with ultrafine microfibrils and multiple petroleum-based materials as the binders in an alkaline aqueous solution, the method including using binders; a first step of agitating an aqueous solution of the ultrafine microfibrils at high speed using ion-exchanged water; a second step of adding zinc oxide powder to the aqueous solution obtained in the first step to obtain a second aqueous solution; a third step of dissolving solid KOH in the aqueous solution obtained in the second step; a fourth step of adding a first one of the petroleum-based materials to the aqueous solution obtained in the third step; and a fifth step of adding a powder mixture of zinc and a second one of the petroleum-based materials to the aqueous solution obtained in the fourth step.

BRIEF DESCRIPTION OF THE DRAWINGS

FIG. 1 is a diagram illustrating a procedure for producing an alkaline battery according to the present disclosure.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, an alkaline battery and a method of producing negative electrode gel for an alkaline battery according to embodiments of the present disclosure are described. As used herein, the singular forms "a", "an", and "the" are intended to include the plural forms as well, unless the context clearly indicates otherwise.

Hereinafter, embodiments of the present disclosure are described, but the scope of the present embodiment is not limited to the description including the Examples.

The alkaline battery according to the present embodiment uses plant-derived ultrafine microfibrils as a negative electrode binder. The plant-derived ultrafine fiber is, for example, a material that uses wood-based materials such as wood flour, chips, and bamboo as raw materials, and has a high aspect ratio with a diameter of about 3 to 100 nm and a length of about several hundred nm to several μm. In addition, the ultrafine microfibrils are basically a hydrophilic material unless hydrophobized, and act as a thickener or a gelling agent when dispersed in an aqueous solution.

The wood-based materials include microfibrils, lignin, and the like. By delaminating the cell walls of these wood-based materials, extremely fine microfibrils can be obtained. The delaminating methods include a chemical treatment method such as a TEMPO oxidation method as in Japanese Patent Application Publication No. 2008-1728, a phosphoric acid ester method as in Japanese Patent Application Publication No. 2017-25468, and a physical treatment method such as an underwater counter-collision method as in Japanese Patent Application Publication No. 2005-270891.

A petroleum-based material such as polyacrylic acid used as a negative electrode binder has a structure in which functional groups such as hydroxyl groups are branched in a tree shape in a molecular chain having a diameter of about 0.1 nm, while the ultrafine microfibril is considered to have a functional group attached to a linear fiber having a diameter of about 3 nm. Therefore, it is considered that the number of functional groups per unit weight of ultrafine microfibrils is smaller than that of the petroleum-based material having a large number of functional groups in the molecular chain. In the negative electrode gel containing ultrafine microfibrils, as the number of functional groups decreases, the number of water molecules trapped in the functional groups decreases, and it can be expected that discharge performance is improved.

In the case of using ultrafine microfibrils as the negative electrode binder for alkaline batteries, it is possible to obtain the viscosity required for the negative electrode gel by uniformly dispersing the ultrafine microfibrils as the binder in the negative electrode gel to form a three-dimensional network structure. Here, in order to uniformly disperse the ultrafine microfibrils in the negative electrode gel, it is necessary to apply a strong shearing force using a high-speed agitator or the like. However, at that moment, if a solid content such as zinc powder or solid potassium hydroxide is added to the aqueous solution, the viscosity of the aqueous solution increases rapidly, so that a high-speed agitator or the like cannot be used. Then, even if water is added thereafter, the ultrafine microfibrils cannot be uniformly dispersed, and as a result, the viscosity of the entire system may be insufficient. Therefore, it is preferable to sufficiently disperse the ultrafine microfibrils in water before adding a solid substance such as zinc powder or solid potassium hydroxide to the aqueous solution. Note that FIG. 1 illustrates an example of a method of producing an alkaline battery as described above. Details are described in Examples below.

If the content of the ultrafine microfibrils is too small, the effect of improving the discharge performance is not so much observed, but if it is too large, the viscosity of the negative electrode gel increases significantly, which adversely affects the manufacturability of the battery. Generally, the solid content, that is, the ultrafine microfibrils are preferably 0.2 to 0.7% by weight based on the aqueous solution content of the negative electrode gel.

Examples of the Present Disclosure

Hereinafter, the present embodiment is described in more detail with reference to Examples, but the present embodiment should not be limited to these Examples.

The polyacrylic acid used as the negative electrode material was replaced with the ultrafine microfibrils of the present embodiment, and an AA alkaline battery was produced as in the following steps. The ultrafine microfibrils used were cellulose nanofibers having a diameter of about 3 nm and a length of several μm.

First, the procedure for producing the negative electrode gel is described with reference to FIG. 1.
(1) An aqueous solution of ultrafine microfibrils and ion-exchanged water were mixed with a high-speed agitator (s11b).
(2) Zinc oxide powder was added to the aqueous solution obtained by s11b (s12b).
(3) Solid potassium hydroxide was gradually dissolved in the aqueous solution obtained by s12b (s13b). Note that, since water evaporated due to heat generation, ion-exchanged water was appropriately added to adjust the weight.
(4) Polyacrylic acid, a first petroleum-based material, was added with agitating to the aqueous solution obtained by s13b (s14b).
(5) To the aqueous solution obtained by s14b, a pre-mixed powder mixture of zinc and sodium polyacrylate, a second petroleum-based material, was added and agitated to prepare a negative electrode gel (s15b).

Next, the procedure of producing the alkaline battery according to the present embodiment is described.
(1) A granular mixed agent, obtained by mixing graphite, a binder, a potassium hydroxide solution, and the like with manganese dioxide as an active material, was pressed in a mold to prepare a ring-shaped positive electrode mixed agent (s11a).
(2) The positive electrode mixed agent molded in (1) above was fitted into the positive electrode can as the exterior body (s12a).
(3) The upper end of the body of the positive electrode can was beaded, and a sealant was applied to the portion in contact with the gasket (s13a).
(4) A separator was inserted inside the positive electrode mixed agent ring fitted to the positive electrode can (s14a).
(5) The potassium hydroxide electrolyte solution was impregnated into the separator and the positive electrode mixed agent (s15a).
(6) The separator was filled with the negative electrode gel obtained in s15b (s16).
(7) An alkaline battery was obtained by sealing with a current collector (current collector, gasket, negative electrode terminal) (s17).

Table 1 presents results obtained by measuring the thus-produced AA alkaline batteries in terms of viscosity (measured at a rotation speed of 50 rpm using a type B viscometer), discharge performance (discharged for 1 hour per day at JIS standard 250 mA (1 hpd)), ultrafine microfibril ratio (solid content; the same applies hereinafter), and polyacrylic acid ratio in the aqueous solution content of the negative electrode gel. Note that a Comparative Example 1 lacking ultrafine microfibrils was used as a reference against which to measure the performance of the batteries produced as examples of the present embodiment.

TABLE 1

|  | Polyacrylic Acid Ratio (wt %) in Aqueous Solution Content of Negative Electrode Gel | Ultrafine microfibril Ratio (wt %) in Aqueous Solution Content of Negative Electrode Gel | Viscosity (%) | 250 mA 1 hpd (%) | Amount of Petroleum-Based Material Used (%) |
|---|---|---|---|---|---|
| Example 1 | 1.0 | 0.1 | 98 | 98 | 96 |
| Example 2 | 0.9 | 0.2 | 101 | 110 | 93 |

TABLE 1-continued

|  | Polyacrylic Acid Ratio (wt %) in Aqueous Solution Content of Negative Electrode Gel | Ultrafine microfibril Ratio (wt %) in Aqueous Solution Content of Negative Electrode Gel | Viscosity (%) | 250 mA 1 hpd (%) | Amount of Petroleum-Based Material Used (%) |
|---|---|---|---|---|---|
| Example 3 | 0.5 | 0.6 | 112 | 115 | 78 |
| Example 4 | 0.4 | 0.7 | 136 | 108 | 74 |
| Example 5 | 0.2 | 0.9 | 203 | 112 | 67 |
| Comparative Example 1 | 1.1 | 0.0 | 100 | 100 | 100 |

In Example 1, in which the ultrafine microfibril ratio in the aqueous solution content of the negative electrode gel was 0.1 wt %, almost the same discharge performance as in Comparative Example 1 was obtained. Then, petroleum-based materials could be reduced by 4%. In other words, it can be said that we succeeded in reducing the petroleum-based materials while maintaining good discharge performance.

In Example 2, in which the ultrafine microfibril ratio in the aqueous solution content of the negative electrode gel was 0.2 wt %, the discharge performance was improved by 10% as compared with Comparative Example 1. This is presumably because the ultrafine microfibrils formed a network structure, achieving effective use of the water content in the negative electrode gel.

In Example 3, in which the ultrafine microfibril ratio in the aqueous solution content of the negative electrode gel was 0.6 wt %, the discharge performance was improved by 15% as compared with Comparative Example 1.

In Example 4, in which the ultrafine microfibril ratio in the aqueous solution content of the negative electrode gel was 0.7 wt %, the discharge performance was improved by 8% as compared with Comparative Example 1. The viscosity increased slightly, but it is within the range where there is no problem in practical use.

In Example 5, in which the ultrafine microfibril ratio in the aqueous solution content of the negative electrode gel was 0.9 wt %, the discharge performance was improved by 12% as compared with Comparative Example 1. On the other hand, the viscosity was 200% or more of that of Comparative Example 1, lowering the fluidity of the negative electrode gel in the injection nozzle or the hopper for agitating the gel. Therefore, in consideration of productivity, the ultrafine microfibril ratio is preferably 0.9 wt % or less.

In alkaline batteries, the use of plant-derived ultrafine microfibrils as the negative electrode binder has made it possible to lessen the environmental impact of the batteries.

The above-described embodiments are intended to facilitate an understanding of the present disclosure and are not in any way to be construed as limiting the present disclosure. The present disclosure may be modified and improved without departing from the scope of the disclosure, and equivalents thereof are also encompassed within the disclosure.

What is claimed is:

1. An alkaline primary battery having a positive electrode and a negative electrode, the alkaline battery comprising:
   manganese dioxide for a positive electrode active material; and
   a negative electrode gel in which a negative electrode active material made of a zinc alloy and a binder are dispersed in an alkaline aqueous solution,
   wherein the binder contains cellulose nanofibers having a diameter of about 3 nm and a length of several μm and polyacrylic acid,
   the cellulose nanofibers having a diameter of about 3 nm are linear fibers to which functional groups are attached and are uniformly dispersed in the negative electrode gel to form a three-dimensional network structure,
   the aqueous solution of the negative electrode gel contains between 0.4 wt % and 0.9 wt % polyacrylic acid, and
   the aqueous solution of the negative electrode gel contains between 0.2 wt % and 0.7 wt % cellulose nanofibers,
   wherein discharge performance of the alkaline battery is improved by at least 8% and the negative electrode gel has a viscosity of 203% or less compared to the same alkaline battery in which the aqueous solution contains no nanofibers.

2. A method of producing a negative electrode gel for the alkaline battery of claim 1 in which a negative electrode active material made of a zinc alloy is dispersed together with nanofibers and multiple petroleum-based materials as binders in an alkaline aqueous solution, the method comprising:
   a first step of agitating an aqueous solution of the nanofibers at high speed using ion-exchanged water;
   a second step of adding zinc oxide powder to the aqueous solution obtained in the first step;
   a third step of dissolving solid KOH in the aqueous solution obtained in the second step;
   a fourth step of adding a first one of the petroleum-based materials to the aqueous solution obtained in the third step; and
   a fifth step of adding a powder mixture of zinc and a second one of the petroleum-based materials to the aqueous solution obtained in the fourth step.

* * * * *